United States Patent
Clearman

[15] 3,654,770
[45] Apr. 11, 1972

[54] ICE MAKER CONSTRUCTION

[72] Inventor: Jack F. Clearman, Stevensville, Mich.

[73] Assignee: Whirlpool Corporation, Benton Harbor, Mich.

[22] Filed: Oct. 17, 1969

[21] Appl. No.: 867,149

[52] U.S. Cl. ..................................................62/320, 62/348
[51] Int. Cl. .........................................................F25c 1/14
[58] Field of Search ...................62/354, 320, 348; 74/665

[56] References Cited

UNITED STATES PATENTS

| | | | |
|---|---|---|---|
| 1,963,842 | 6/1934 | Gay | 62/354 X |
| 3,126,719 | 3/1964 | Swatsick | 62/354 X |
| 3,367,127 | 2/1968 | Walker | 62/353 X |
| 989,486 | 4/1911 | Crandell | 74/665 X |

FOREIGN PATENTS OR APPLICATIONS

| | | | |
|---|---|---|---|
| 409,499 | 5/1934 | Great Britain | 62/354 |

Primary Examiner—William E. Wayner
Attorney—Hill, Sherman, Meroni, Gross & Simpson, James S. Nettleton, Thomas E. Turcotte, Burton H. Baker, Donald W. Thomas, Gene A. Heth, Franklin C. Harter, Anthony Niewyk and Robert L. Judd

[57] ABSTRACT

An ice maker of the type employing a refrigerated chamber and harvesting auger positioned with its flight in scraping relation to an inner wall of the refrigerated chamber for continuously scraping ice particles from the wall thereof, and being provided with a vertical shaft for supporting the harvesting auger. Transfer means receive discharge from the harvesting auger and transfer the same under pressure developed by the harvesting auger into a separate compression chamber disposed adjacent to the refrigerated chamber. A helical compression auger rotatable within the compression chamber drives the ice product in the form of a confined columnar path through a restricting orifice to form a column of hard ice which may be broken into short lengths by any suitable means to obtain "ice cubes." A single common driving motor may be utilized to drive both augers or, if desired, separate gear means for the compression auger may be provided and driven by a separate motor unit or by a power take-off from a drive source utilized for the harvesting auger.

4 Claims, 2 Drawing Figures

PATENTED APR 11 1972

INVENTOR.
JACK F. CLEARMAN

BY Hill, Sherman, Meroni, Gross & Simpson
ATTORNEYS

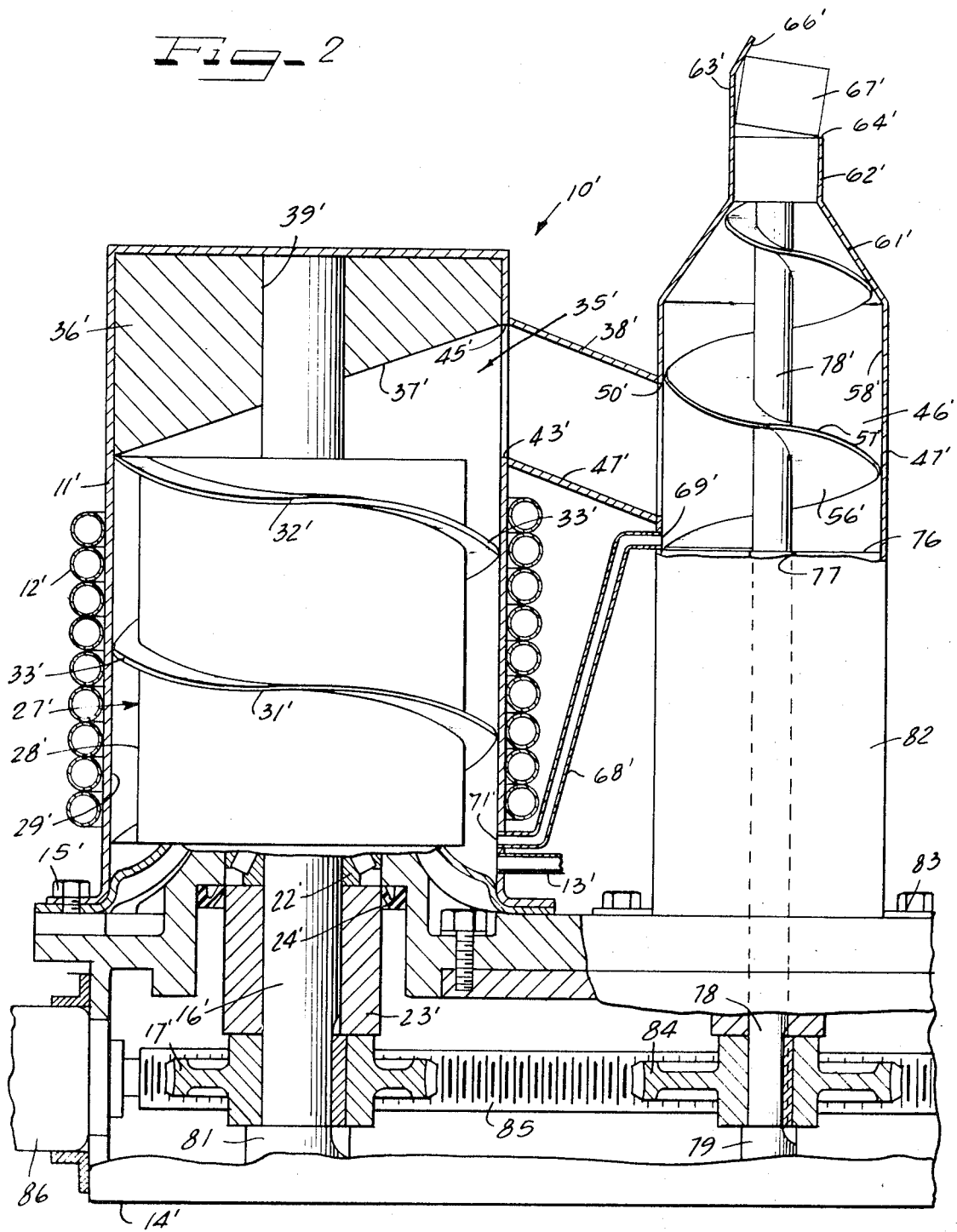

ICE MAKER CONSTRUCTION

BACKGROUND OF THE INVENTION

1. Field of the Invention

This invention relates generally to ice maker constructions.

2. Description of the Prior Art

The prior art has numerous examples of machines arranged to continuously produce flakes of ice or other frozen materials. Most prior art structures show arrangements wherein ice products are harvested and compressed in a single unitary casing.

SUMMARY OF THE INVENTION

The present invention provides an ice maker wherein an ice product is produced by scraping inner walls of a cylindrical freezing compartment with peripheral edges of helical flights of a substantially vertically disposed harvesting auger. A wet mass of ice particles including slush and chunks, is axially advanced out of the freezing chamber and into a transferring means forming an outlet for the freezing chamber and having a configuration for laterally transferring the mass of ice particles under pressure developed by the harvesting auger and into a compression chamber disposed laterally of the freezing compartment.

The mass of ice particles collects in the transferring means until sufficient pressure develops to move the soft ice into an orbital path of a compression auger where it is then picked up and squeezed through a restricting orifice to emerge as a column of hard ice. The column of hard ice may have a rectangular, square or other cross section as determined by the cross section of the orifice, and means are provided for transversely breaking the column of ice into discrete lengths of any suitable dimension to form "ice cubes." Excess water removed by the compression auger is returned to the freezing chamber.

The transferring means are characterized by a wall surface spaced axially from a discharge end of the harvesting auger and obliquely formed relative to a longitudinal axis thereof. The mass of ice particles axially advancing from the harvesting auger is pressed against the obliquely formed wall surface and thereby given a lateral component of movement toward the compression chamber. The continuous advancing of the mass of ice particles under the pressure developed by the harvesting auger eliminates the tendency of the transferring means to become clogged with agglomerated ice particles.

Furthermore, the ice maker of the present invention is characterized by the provision of a drive means for the two augers which may comprise either a common driving motor or a separate motor for each respective auger. In one embodiment of the present invention, separate gear drive means are driven by a common motor, and in an alternative embodiment, each auger has its own motor and gear reduction unit.

BRIEF DESCRIPTION OF THE DRAWINGS

In the accompanying drawings forming a part of this specification and in which like reference characters are employed to designate like parts throughout the same:

FIG. 2 is a cross sectional view of an ice maker construction embodying the features of an alternative embodiment of the present invention.

DESCRIPTION OF THE PREFERRED EMBODIMENTS

Figure 1:
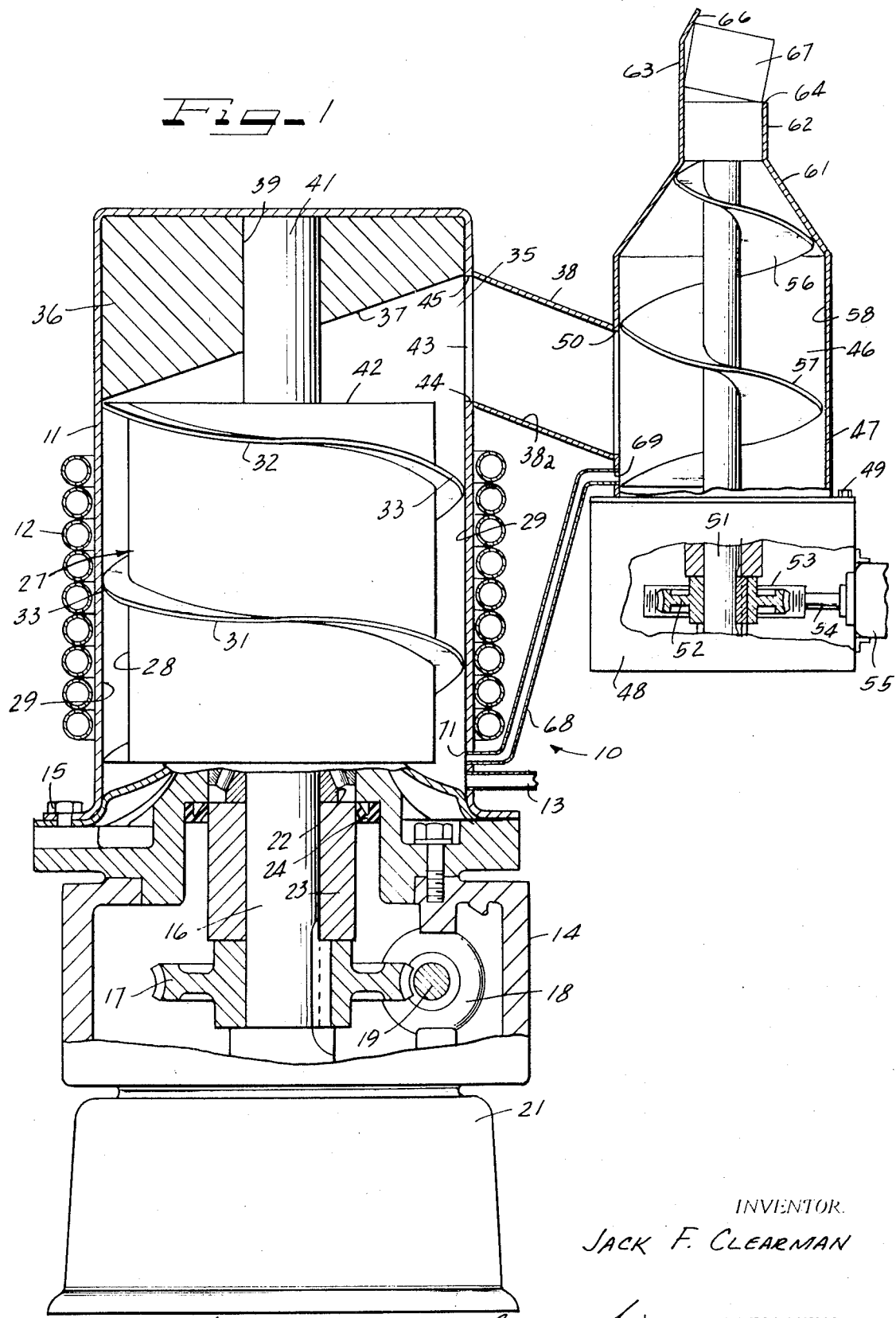
FIG. 1 is a cross sectional view of an ice maker construction utilizing the improvements of one embodiment of the present invention.

Referring to the drawings, an improved ice maker 10, embodying the features of the present invention, desirably includes a generally upright cylindrical freezing cylinder 11 having disposed in circumjacent relation thereto coils 12 of an evaporator forming part of a refrigeration system.

Water is introduced into the cylinder 11 through an inlet conduit 13 disposed near the base of the cylinder. The cylinder 11 is mounted in a generally upright position on a drive housing 14 by suitable fastening means such as bolts 15. Within the drive housing 14 there is a centrally disposed shaft 16 to which is keyed a gear 17 which meshes with a worm 18 mounted on a shaft 19, the latter being driven by a suitable motor (not shown).

A lower end portion of the shaft 16 is supported within a suitable bearing means disposed within a bearing housing 21. Additional support for the shaft 16 is provided by a roller bearing assembly 22 and a spacer element 23 disposed between the gear 18 and the bearing unit 22. Water is prevented from entering the drive housing 14 by suitable seal means including a flexible shaft seal 24 engaging an outer periphery of the shaft 16.

An auger 27 is connected to the shaft 16 and projects upwardly into the freezing cylinder 11. The auger 27 has a cylindrical portion 28 spaced inwardly from a cylindrical, refrigerated wall 29 of the cylinder 11. The cylindrical portion 28 has an outer diameter relatively larger than the diameter of the shaft 16 and carries two flights of helically disposed blades 31 and 32 having scraping edges 33 which scrape against the inner wall 29, thereby to harvest a thin film of ice which forms on the refrigerated surface whenever water is circulated in the freezing chamber. Rotation of the harvesting auger 27 progressively advances a mixture of ice particles, including slush and chunks, upwardly toward an upper end portion of the cylinder 11 and into a transferring means generally indicated at 35.

In accordance with the principles of the present invention, the transferring means 35 desirably includes a cover 36 overlying the upper end portion of the cylinder 11 and providing a tapered wall surface 37 formed to laterally move the mass of ice particles advanced upwardly by the harvesting auger into a transfer conduit 38. The cover 36 may include a central bore 39 providing a bearing surface in which an upper end portion 41 of the shaft 16 is journalled. The wall surface 37 is formed obliquely to a longitudinal axis of the harvesting auger 27 and forms an action surface which extends upwardly from an upper terminal edge 42 of the harvesting auger and toward the transfer conduit 38.

An outlet aperture 43 is formed in the cylinder 11 at one end of the transfer conduit 38 and is characterized by a bottom wall 44 parallel with the upper terminal edge 42 of the harvesting auger 27 and a top wall 45 parallel with the uppermost extent of the obliquely formed wall 37. The transfer conduit 38 extends downwardly and laterally outwardly from the aperture 43 and interconnects the cylinder 11 with a compression chamber 46, the latter being disposed laterally of the cylinder 11. Also, the transfer conduit 38 provides an inner bore 38a coextensive with the aperture 43 and an aperture 50 providing inlet means into the compression chamber 46 at the other end of the conduit 38.

Furthermore, in accordance with the principles of the present invention, the compression chamber 46 is provided within a cylinder 47 disposed parallel to and laterally spaced from the cylinder 11. The compression cylinder 47 is mounted on a separate gear housing 48 by suitable fastening means such as bolts 49. A shaft 51 is disposed centrally within the gear housing 48 and has a gear 52 keyed thereto and meshed with a worm 53 mounted on a shaft 54, the latter being driven by a suitable separate motor 55. The shaft 51 is supported within suitable bearing means in a manner similar to that for the shaft 16, and seal means are provided for preventing water from entering the gear housing 48.

A helical flight 46 encircles the shaft 22 and projects upwardly through the compression chamber 46 without any additional bearing support, thereby to provide a compression auger. The auger provided by the helical flight 56 has an outer peripheral edge 57 disposed in close proximity to an inner cylindrical wall 58 of the compression chamber 46.

The mass of ice particles harvested and axially advanced by the auger 27 collects within the transferring means 35 and is pushed against the obliquely formed wall 37 until sufficient pressure develops to laterally move the soft ice through the transfer conduit 38 and into an orbital path of the compression auger flights 56. The angle of inclination of the obliquely formed wall 37 should be formed so that the axially upwardly directed pressure created by the harvesting auger 27 develops a substantial lateral force as the mass of ice particles is pressed against the obliquely formed wall, thereby to transfer the ice particles under the pressure developed by the harvesting auger.

The compression auger 56 picks up the mass of ice particles delivered thereto by the transferring means 35 and squeezes the same through a restricting orifice 61, thereby to remove excess water and form a column of hard ice emerging from a discharge outlet 62. The emerging column of hard ice may have a rectangular, square or other cross section as determined by the cross section of the discharge outlet 62.

To form "ice cubes," the emerging column of hard ice is directed upwardly against a breaking means which transversely shears the column into short lengths. The breaking means may include a member 63 projecting upwardly from a terminal edge 64 of the discharge conduit 62 and extending about a relatively small segment of the periphery of the outlet conduit. The member 63 is characterized by a surface 66 slanting inwardly of the discharge conduit 62 so that an uppermost edge of the emerging column of hard ice engages thereagainst, thereby to laterally direct the emerging column of hard ice for creating a shearing force substantially along a line parallel with the terminal edge 64 of the outlet conduit. In this manner short lengths of the emerging column of hard ice are broken to form "ice cubes" such as 67.

Excess water squeezed from the mass of ice particles by the discharge orifice 61 drains from the compression chamber 46 through the conduit 68 which extends from an aperture 69 disposed near the base of the compression cylinder 46 and down to an aperture 71 formed in the cylinder 11 adjacent the inlet conduit 13. In this manner, the excess water squeezed from the mass of ice particles as the same is compressed into a column of hard ice returns to the freezing cylinder 11 and mixes with the inlet water.

Referring now specifically to FIG. 2, an ice maker 10', constructed in accordance with the principles of an alternative embodiment of the present invention, includes a separate gear drive for the compression auger which is driven by a power take-off from the motor unit for the harvesting auger. The detailed construction of the freezing cylinder, harvesting auger, transfer means, and compression means of this form of the present invention are identical in construction to that described for the first embodiment, as illustrated in FIG. 1, and therefore, like parts are identified with like reference numerals to which a prime has been added.

It is contemplated by this embodiment of the present invention, to drive the compression unit by a power take-off from the drive means of the main harvesting auger 27'. The compression cylinder 37 has a bottom wall 76 characterized by a centrally disposed bore 77 through which a shaft 78 extends. Seal means are provided for preventing water from passing through the aperture 77. The compression auger flights 56' are carried by an upper end portion of the shaft 78, and a lower end portion thereof as at 79 is approximately coextensive with a lower end portion as at 81 of the shaft 16' which carries the harvesting auger 27'.

The drive housing 14' is laterally extended and supports an extended lower portion 82 of the compression cylinder 47' which is fastened thereto by a suitable fastening means such as bolts 83. The lower end of the shaft 78 has a gear 84 keyed thereto and disposed in meshing relationship with a worm 85 which in turn meshes with the gear 17' keyed onto the harvesting auger shaft 16'. A single motor 86 drives the worm 85, thereby to provide a common motor means for driving the separate gears 17' and 84 provided respectively for the harvesting auger 27' and the compression auger 56'.

From the foregoing, it will be noted that the ice maker construction of the present invention provides a lateral flow arrangement whereby ice particles harvested by the harvesting auger are laterally forced under pressure developed by the continuous, axial discharge of particles by the harvesting auger. Thus, the mass of ice particles is smoothly moved into an orbital path of a laterally disposed compression auger, . Furthermore, the construction of the present invention provides a separate compression unit having its own gear means which may be driven by either a power take-off from the drive unit of the main harvesting auger or by a separate motor unit. The configuration of the compression unit permits a main harvesting unit to be formed in a manner for receiving interchangeable compression units adapted for providing various ice products, for example ice cubes, chipped ice, flaked ice and the like. auger. Furthermore, Although minor modifications might be suggested by those versed in the art, it should be understood that I wish to embody within the scope of the patent warranted hereon all such modifications as reasonably and properly come within the scope of my contribution to the art.

The embodiments of the invention in which an exclusive property or privilege is claimed are defined as follows:

1. An ice maker comprising:
   chamber means having separate vertically disposed laterally spaced chambers including
      a first freezing chamber having an upright refrigerated cylinder wall,
      a second compression chamber spaced laterally from said first chamber and having a centrally disposed top outlet and upright axially converging walls to form a compression zone subjacent to but communicating with said top outlet,
   gear box means having reduction gears therein and disposed below said chambers,
   and first and second shafts extending upwardly out of said gear box means and projecting into said corresponding first and second chambers, respectively,
      said first shaft having a harvesting auger corotatable therewith and including flights in operative proximity to said refrigerated wall,
   thereby to harvest an ice product and advance it upwardly,
      said second shaft having screw blades corotatable therewith and disposed for rotation in said compression chamber for compressing ice product and for axially directing a compacted dehydrated column of ice out of said top outlet in an upward direction,
   intermediate transfer means between the top of said freezing chamber and the bottom of said compression chamber including means to mechanically transfer ice product harvested in said first chamber by lateral displacement from the top of said first chamber to the bottom of said second chamber,
   water means for supplying water to said freezing chamber and including conduit means for draining water removed from the ice product in said compression chamber,
   motor means to rotatably drive said shaft thereby to harvest ice product in said first chamber and to compact and dehydrate the same in said second chamber,
   and breaking means outwardly of said top outlet to break the emerging column of ice into utilitarian pieces of selected size and shape.

2. An ice maker as defined in claim 1 wherein said motor means comprises a common motor and separate gear connections between said motor and each of said shafts to rotatably drive said shafts at selected speeds for the purposes set forth.

3. An ice maker as defined in claim 1 wherein said motor means comprises a separate motor for each shaft, and each motor has a driving connection to a corresponding shaft to rotatably drive said shafts at selected speeds for the purposes set forth.

4. An ice maker as defined in claim 1 wherein said conduit means connects said compression chamber to said freezing chamber.

* * * * *